United States Patent
Ha (10) Patent No.: US 8,542,739 B2
(45) Date of Patent: Sep. 24, 2013

(54) METHOD OF ESTIMATING DISPARITY VECTOR USING CAMERA PARAMETERS, APPARATUS FOR ENCODING AND DECODING MULTI-VIEW PICTURE USING THE DISPARITY VECTOR ESTIMATION METHOD, AND COMPUTER-READABLE RECORDING MEDIUM STORING A PROGRAM FOR EXECUTING THE METHOD

(75) Inventor: Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1512 days.

(21) Appl. No.: 11/529,404

(22) Filed: Sep. 29, 2006

(65) Prior Publication Data

US 2007/0071107 A1   Mar. 29, 2007

Related U.S. Application Data

(60) Provisional application No. 60/721,578, filed on Sep. 29, 2005.

(30) Foreign Application Priority Data

Apr. 12, 2006 (KR) .................. 10-2006-0033209

(51) Int. Cl.
*H04N 11/02* (2006.01)
(52) U.S. Cl.
USPC ................................. 375/240.16; 375/240.01
(58) Field of Classification Search
USPC .......... 375/240.12, 240.16; 348/153, 207.99; 705/410, 418
See application file for complete search history.

(56) References Cited

U.S. PATENT DOCUMENTS

| | | | |
|---|---|---|---|
| 6,005,607 A | 12/1999 | Uomori et al. | |
| 6,055,012 A | 4/2000 | Haskell et al. | |
| 6,144,701 A | 11/2000 | Chiang et al. | |
| 6,163,337 A | 12/2000 | Azuma et al. | |
| 6,911,995 B2 | 6/2005 | Ivanov et al. | |
| 7,373,004 B2 * | 5/2008 | Chang et al. | 382/236 |
| 2002/0175921 A1 | 11/2002 | Xu et al. | |
| 2003/0202592 A1 | 10/2003 | Sohn et al. | |
| 2004/0240725 A1 * | 12/2004 | Xu et al. | 382/154 |
| 2005/0105610 A1 * | 5/2005 | Sung | 375/240.01 |
| 2005/0185048 A1 | 8/2005 | Ha | |

FOREIGN PATENT DOCUMENTS

| | | |
|---|---|---|
| JP | 8-201941 A | 8/1996 |
| JP | 9-74573 A | 3/1997 |
| JP | 10-13860 A | 1/1998 |
| JP | 2004-48725 A | 2/2004 |

(Continued)

OTHER PUBLICATIONS

Communication issued Jun. 25, 2012 by the Korean Intellectual Property Office in counterpart Korean Application No. 10-2006-0033209.

(Continued)

*Primary Examiner* — David Czekaj
*Assistant Examiner* — Leron Beck
(74) *Attorney, Agent, or Firm* — Sughrue Mion, PLLC (57) ABSTRACT

A disparity vector estimation method and an apparatus are provided for encoding and decoding a multi-view picture using the disparity vector estimation method. The method of estimating a disparity vector of a multi-view picture includes determining a disparity vector between two frames having a different viewpoint from a current viewpoint, and calculating a disparity vector of a current viewpoint frame using the determined disparity vector and a certain translation parameter.

12 Claims, 6 Drawing Sheets

(56) References Cited

FOREIGN PATENT DOCUMENTS

| JP | 2004-200814 A | 7/2004 |
|---|---|---|
| KR | 10-2003-0083285 A | 10/2003 |
| KR | 1020050046108 A | 5/2005 |
| KR | 100517517 B1 | 9/2005 |
| WO | 2007/035042 A1 | 3/2007 |
| WO | 2007/035054 A1 | 3/2007 |

OTHER PUBLICATIONS

Sung, Woo Cheol et al. "Adaptive Spatio-Temporal Prediction for Multi-view Coding in 3D-Video", pp. 214-224, Sep. 3, 2004.

Communication dated Nov. 15, 2011, issued by the Japanese Patent Office in corresponding Japanese Patent Application No. 2008-533250.

Extended European Search Report issued on Jan. 21, 2011 in counterpart European Patent Application No. 06798996.2.

Kimata, H. et., al. "On direct mode for anchor pictures of MVC", Joint Video Team (JVT) of ISO/IEC MPEG & ITU-T VCEG, NTT Corporation, Hangzhou, China Oct. 20-27, 2006. pp. 1-6.

Yang. J. "Results on CE2 in Multiview Video Coding", LG Electronics, International Organization for Standardization Organization International De Normalisation ISO/IEC JTC1/SC29/WG11, Klagenfurt, AU, Jul. 2006.

Zhu, G et., al. "Inter-view Symmetric Mode in MVC", ISO/IEC JTC1/SC29/WG11, Tsinghua University, Hisilicon Technologies Co., Ltd., Montreux, Apr. 2006.

Zhu, G et., al. "Inter-view Direct Mode in MVC", ISO/IEC JTC1/SC29/WG11, Tsinghua University, Hisilicon Technologies Co., Ltd., Montreux, Apr. 2006.

Zhu, G. et., al. "Report of Core Experiment on Inter-view Direct Mode (Multi-view Video Coding CE4)", ISO/IEC JTC1/SC29/WG11, Tsinghua University, Montreux, Apr. 2006.

"Survey of Algorithms used for Multi-view Video Coding (MVC)" ISO/IEC JTC1/SC29/WG11, Hong Kong, China, Jan. 2005.

Lee, Y. et., al. "Multi-view video coding using 2D direct mode" ISO/IEC JTC1/SC29/WG11, Sejong University, Palma de Mallorca, Oct. 2004, pp. 1-7.

Lee, Y. et., al. "Multi-view video coding using illumination change-adaptive motion estimation/motion compensation and 2D direct mode", ISO/IEC JTC1/SC29/WG11, Sejong University and Humax, Hong Kong, Jan. 2005, pp. 1-6.

"Text of Committee Draft of Joint Video Specification (ITU-T Rec. H-264 ISO/IEC 14496-10 AVC)", ISO/IEC JTC1/SC29/WG11, vol. MPEG02, No. N4810, May 1, 2002, pp. 104-105.

Ohm, J. "Stereo/Multiview Video Encoding Using the MPEG Family of Standards", Heinrich-Hertz-Institute, Image Processing Department, Berlin, Germany, pp. 242-253.

Wang, R. et., al. "Multiview Video Sequence Analysis, Compression, and Virtual Viewpoint Synthesis" IEEE Transactions of Circuits and Systems for Video Technology, vol. 10, No. 3, Apr. 2000, pp. 397-410.

Ohm, J. et., al. "An Object-Based System for Stereoscopic Viewpoint Synthesis", IEEE Transactions on Circuits and systems for Video Technology, vol. 7, No. 5, Oct. 1997, pp. 801-811.

Ding, Y. et., al. "Direct Virtual Viewpoint Synthesis from Multiple Viewpoints", IEEE, vol. 1, Sep. 11, 2005, pp. 1045-1048.

Chen, S. E. et., al. "View Interpolation for Image Synthesis" Apple Computers, Inc., Computer Graphics Proceedings, Annual Conference Series, 1993, pp. 279-288.

Communication dated Oct. 16, 2012 issued by the Japanese Patent Office in counterpart Japanese Patent Application No. 2008-533250.

Communication, dated Mar. 19, 2013, issued by the Korean Patent Office in counterpart Korean Patent Application No. 10-2006-0033209.

\* cited by examiner

METHOD OF ESTIMATING DISPARITY VECTOR USING CAMERA PARAMETERS, APPARATUS FOR ENCODING AND DECODING MULTI-VIEW PICTURE USING THE DISPARITY VECTOR ESTIMATION METHOD, AND COMPUTER-READABLE RECORDING MEDIUM STORING A PROGRAM FOR EXECUTING THE METHOD

This application claims priority from U.S. Patent Application No. 60/721,578, filed on Sep. 29, 2005 in the U.S. Patent Trademark Office, and Korean Patent Application No. 10-2006-0033209, filed on Apr. 12, 2006 in the Korean Intellectual Property Office, the disclosures of which are incorporated herein in their entirety by reference.

BACKGROUND OF THE INVENTION

1. Field of the Invention

The present invention relates to a multi-view picture encoding and decoding apparatus, and more particularly, to a disparity vector estimation method of quickly encoding a multi-view picture and improving the compressibility of the multi-view moving picture, and an apparatus for encoding and decoding a multi-view picture using the disparity vector estimation method.

2. Description of the Related Art

Recently, a new H.264 picture coding video coding standard for high encoding efficiency compared to conventional standards has been developed. The new H.264 picture coding standard depends on various characteristics, consideration of a variable block size between 16×16 and 4×4, a quadtree structure for motion compensation using a loop de-blocking filter, a multi-reference frame, intra prediction, and context adaptability entropy coding, as well as consideration of general bi-directional (B) estimation slices. Unlike the MPEG-2 standard, the MPEG-4 Part 2 standard, etc., the B slices can be referred to as different slices while using multi-prediction obtained from the same direction (forward or backward). However, the above-described characteristics require many bits for encoding motion information including an estimation mode and motion vector and/or reference image.

In order to overcome this problem, a skip mode and a direct mode can be respectively introduced into predicted (P) slices and B slices. The skip and direct modes allow motion estimation of an arbitrary block of a picture to be currently encoded, using motion vector information previously encoded. Accordingly, additional motion data for blocks or macroblocks (MBs) is not encoded. Motions for these modes are obtained using spatial (skip) or temporal (direct) correlation of motions of adjacent MBs or pictures.

Figure 1:
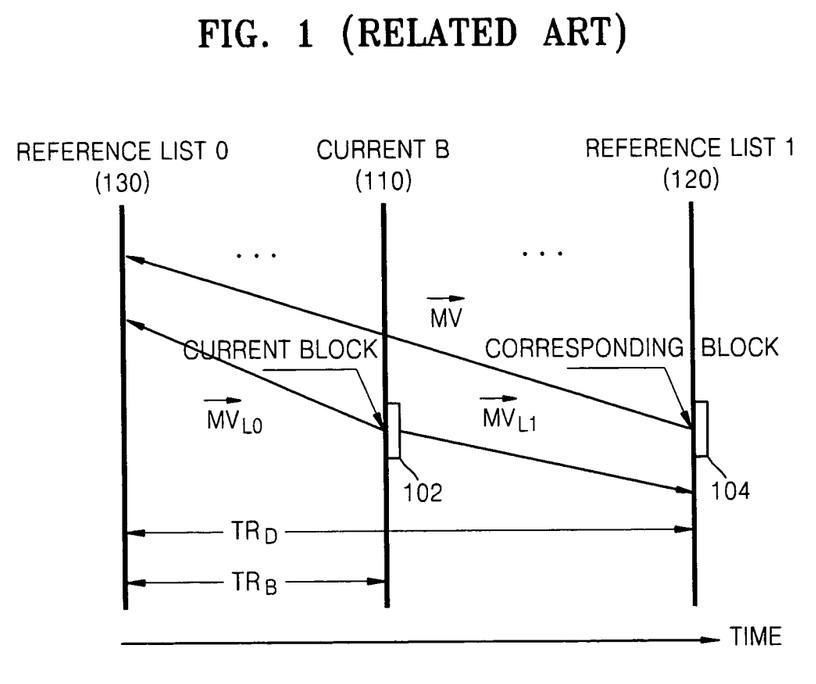
FIG. 1 is a view for explaining a direct mode of a B picture.

FIG. 1 is a view for explaining a direct mode of a B picture.

In the direct mode, a forward motion vector and a backward motion vector are obtained using a motion vector of a co-located block of a temporally following P image, when estimating a motion of an arbitrary block of a B picture to be currently encoded.

In order to calculate a forward motion vector $MV_{L0}$ and a backward motion vector $MV_{L1}$ of a direct mode block 102 whose motion will be estimated in a B picture 110, a motion vector MV for a reference list 0 image 130 is detected. A motion vector refers to the reference list 0 image 130 which a co-located block 104 of a temporally following picture vector. The co-located block 104 is at the same position as the direct mode block 102 in a current B. Thus, the forward motion vector $MV_{L0}$ and the backward motion vector $MV_{L1}$ of the direct mode block 102 of the B picture 110 are calculated using Equations 1 and 2 as follows.

$$\overrightarrow{MV}_{L0} = \frac{TR_B}{TR_D} \times \overrightarrow{MV} \quad (1)$$

$$\overrightarrow{MV}_{L1} = \frac{(TR_B - TR_D)}{TR_D} \times \overrightarrow{MV} \quad (2)$$

where MV represents the motion vector of the co-located block 104 of the reference list 1 picture 120, $TR_D$ represents a distance between the reference list 0 picture 130 and the reference list 1 picture 120, and $TR_B$ represents a distance between the B picture 110 and the reference list 0 picture 130.

Figure 2:
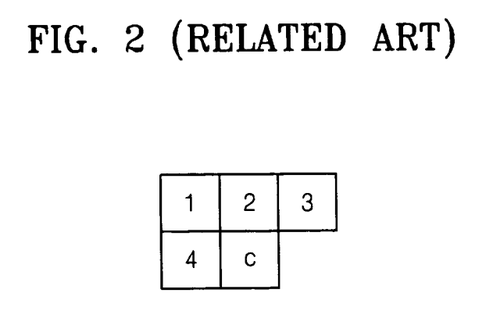
FIG. 2 is a view for explaining a method of estimating a motion vector in a spatial area.

FIG. 2 is a view for explaining a method of estimating a motion vector in a spatial area.

According to the H.264 standard used for encoding moving motion picture data, a frame is divided into blocks, each having a predetermined size, and motion searching for a most similar block to an adjacent frame(s) subjected to encoding is performed. That is, an intermediate value of motion vectors of a left macroblock 4, an upper middle macroblock 2, and an upper right macroblock 3 of a current macroblock c is determined as an estimation value of the corresponding motion vector. The motion vector estimation can be expressed by Equation 3 as follows.

$$\begin{cases} pmvx = \text{MEDIAN}(mvx2, mvx3, mvx4) \\ pmvy = \text{MEDIAN}(mvy2, mvy3, mvy4) \end{cases} \quad (3)$$

As such, a method of encoding a moving picture using spatial correlation as well as temporal correlation has been proposed. However, a method of enhancing the compressibility and processing speed of a multi-view picture having significantly more information than a general moving motion picture, is still required.

SUMMARY OF THE INVENTION

The present invention provides a method and apparatus for encoding a multi-view picture, in order to enhance the compressibility of a multi-view picture and quickly perform encoding of the multi-view picture by estimating disparity using camera parameters.

According to an aspect of the present invention, there is provided a method of estimating a disparity vector of a multi-view picture comprising: determining a disparity vector between two frames having a different viewpoint from a current viewpoint; and calculating a disparity vector of a current viewpoint frame using the determined disparity vector and a certain translation parameter.

According to another aspect of the present invention, there is provided a multi-view picture encoding apparatus comprising: an information confirming unit which receives an encoded multi-view picture bit stream and confirms information indicating a disparity vector estimation method included in the received multi-view picture bit stream; and a decoding unit which decodes the encoded multi-view picture based on the confirmed information, wherein the decoding unit comprises a spatial direct mode performing unit, when the confirmed information is spatial direct mode estimation, which calculates a disparity vector of a current viewpoint frame using a disparity vector between two frames having a different viewpoint from a current viewpoint and a certain translation parameter and estimates a disparity.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the appended drawings.

Figure 3:
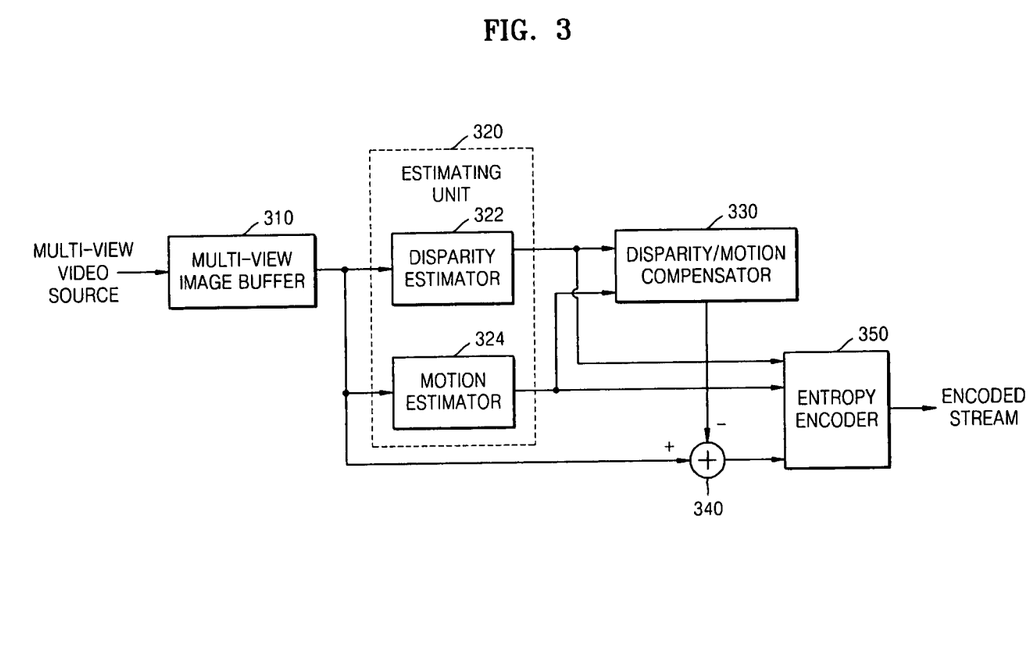
FIG. 3 is a block diagram of a multi-view moving picture encoding apparatus according to an exemplary embodiment of the present invention.

FIG. 3 is a block diagram of a multi-view moving picture encoding apparatus according to an exemplary embodiment of the present invention.

Referring to FIG. 3, the multi-view moving picture encoding apparatus includes a multi-view image buffer 310, an estimating unit 320, a disparity/motion compensator 330, a residual image encoder 340, and an entropy encoder 350.

The multi-view moving picture encoding apparatus receives multi-view image sources obtained from a plurality of camera systems or using a different method. The received multi-view picture sources are stored in the multi-view image buffer 310. The multi-view image buffer 310 provides the stored multi-view picture source data to the estimating unit 320 and the residual image encoder 340.

The estimating unit 320 includes a disparity estimator 322 and a motion estimator 324, and performs disparity estimation and motion estimation on the stored multi-view image sources.

The disparity/motion compensator 330 performs disparity and motion compensation using disparity vectors and motion vectors estimated by the disparity estimator 322 and the motion estimator 324. The disparity/motion compensator 330 reconstructs an image obtained using the estimated motion and disparity vectors and provides the reconstructed image to the residual image encoder 340.

The residual image encoder 340 encodes a residual image obtained by subtracting the image compensated and reconstructed by the disparity/motion compensator 330 from the original image provided by the multi-view image buffer 310 and provides the encoded residual image to the entropy encoder 350.

The entropy encoder 350 receives the estimated the disparity vectors and the motion vectors generated by the estimating unit 320 and the encoded residual image from the residual image encoder 340, and generates a bitstream for the multi-view video source data.

In the disparity estimator 322 illustrated in FIG. 3, disparity information is used for disparity compensation in the same way as motion information for motion estimation and motion compensation is used for conventional codecs such as the H.264 and MPEG 2/4 standards. Similar to an attempt for reducing motion information and increasing encoding efficiency in the H.264 standard, an attempt for reducing disparity information and increasing encoding efficiency in multi-view video coding (MVC) must be made.

Figure 4:
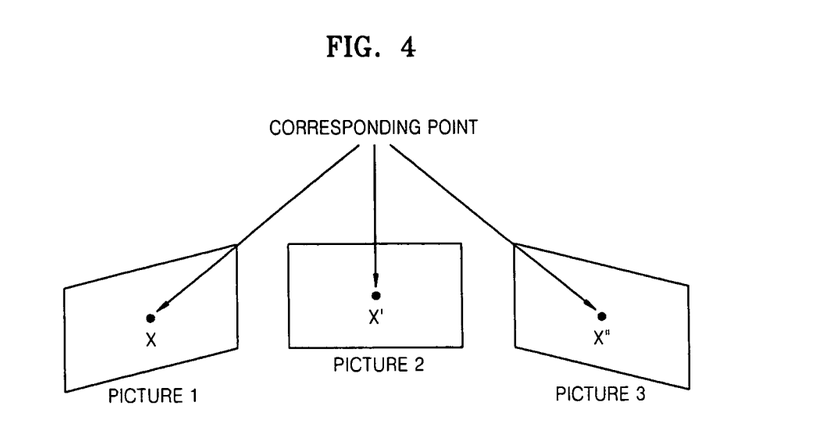
FIG. 4 illustrates a corresponding point in three multi-view pictures photographed by a camera setup according to an exemplary embodiment of the present invention.

FIG. 4 illustrates a corresponding point in three multi-view pictures photographed by a camera setup according to an exemplary embodiment of the present invention. Referring to FIG. 4, when the corresponding point is photographed by three multi-view cameras, the corresponding point is expressed as X in picture 1, as X' in picture 2, and as X" in picture 3.

The description of FIG. 4 will be made based on the assumption that $X=(x, y, 1)^T$ is the location of a picture point X in a certain pixel in a 3D space of an X-Y-Z coordinate system in picture 1. x and y denote normalized values of x and y coordinates, respectively, of an x-y plane using the value with respect to a Z axis. The corresponding points X' and X" of pictures 2 and 3, respectively, are expressed as Equations 4 and 5.

$$X' = K'R_{12}K^{-1}X + K't_{12}/Z \qquad (4)$$

$$X'' = K''R_{13}K^{-1}X + K''t_{13}/Z \qquad (5)$$

wherein K, K', and K" denote camera intrinsic parameters of pictures 1, 2, and 3, respectively, $R_{12}$ and $R_{13}$ denote camera rotation parameters of pictures 2 and 3, respectively, with respect to picture 1, $t_{12}$ and $t_{13}$ denote camera translation parameters of pictures 2 and 3, respectively, with respect to picture 1, and Z denotes a value of a certain point with respect to the Z coordinates.

Figure 5:
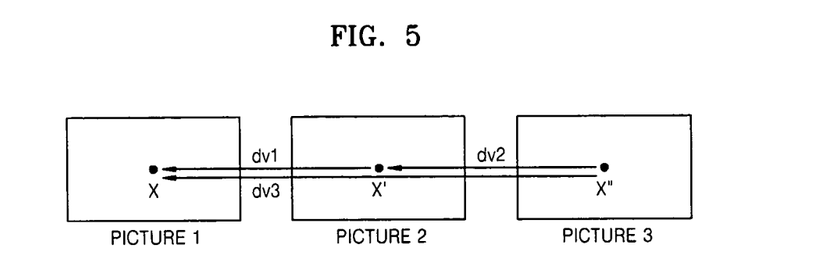
FIG. 5 illustrates one corresponding point in three multi-view pictures photographed in a pure-translation camera setup according to an exemplary embodiment of the present invention.

FIG. 5 illustrates one corresponding point in multi-view pictures photographed in a pure-translation camera setup according to an exemplary embodiment of the present invention.

Pictures photographed by the three multi-view cameras in the pure-translation camera setup, i.e., the three multi-view cameras having the same unique camera characteristics are arranged in parallel to a certain object, are illustrated in FIG. 5. In this case, R=I (in a unit matrix), and K=K'=K" in Equations 4 and 5.

Referring to FIG. 5, X' and X" are points corresponding to X in picture 1. In the pure-translation camera setup, a difference in locations of the points X and X' corresponds to a disparity vector dv1 between the points X and X', a difference in locations of the points X' and X" corresponds to a disparity vector dv2 between the points X' and X", and a difference in locations of the points X and X" corresponds to a disparity vector dv3 between the points X and X". In the pure-translation camera setup, correlations between the points X, X', and X" can be expressed by Equations 6, 7, and 8.

$$X' = X + Kt_{12}/Z \quad (6)$$

$$X'' = X + Kt_{13}/Z \quad (7)$$

$$X'' = X' + Kt_{23}/Z \quad (8)$$

Equation 9 can be derived from Equations 6 and 7.

$$X' - X = \frac{t_{12}}{t_{13}}(X'' - X) \quad (9)$$

When values of $t_{12}$, $t_{13}$, and X"−X, i.e., dv3 are known, a value X'−X, i.e., dv1, can be obtained using Equation 9 instead of a conventional disparity vector search method.

Equation 10 can be derived from Equations 6 and 8.

$$X'' - X' = \frac{t_{23}}{t_{12}}(X' - X) \quad (10)$$

When values of $t_{12}$, $t_{23}$, and X'−X, i.e., dv1 are known, a value X"−X', i.e., dv2, can be obtained using Equation 10 instead of a conventional disparity vector search method.

Consequently, when the pure-translation exists and values of camera translation parameters are known in the multi-view camera setup, a disparity vector between the point X' of a current encoding frame and the corresponding point X" of a first reference frame can be estimated using a disparity vector between the point X' of the current encoding frame and the corresponding point X of a second reference frame.

A multi-view camera can be setup in a manner different from the pure-translation multi-view camera setup. However, although the multi-view camera setup in a manner other than the pure-translation multi-view camera setup photographs a multi-view picture, the multi-view camera has the same condition as the pure-translation multi-view camera setup in terms of performing a rectification process so as to encode the multi-view picture as a pre-process or post-process. Therefore, since it is possible to estimate the disparity vector in the pure-translation multi-view camera setup, it is necessary to encode the multi-view picture using camera parameters corresponding to translations.

Figure 6A:
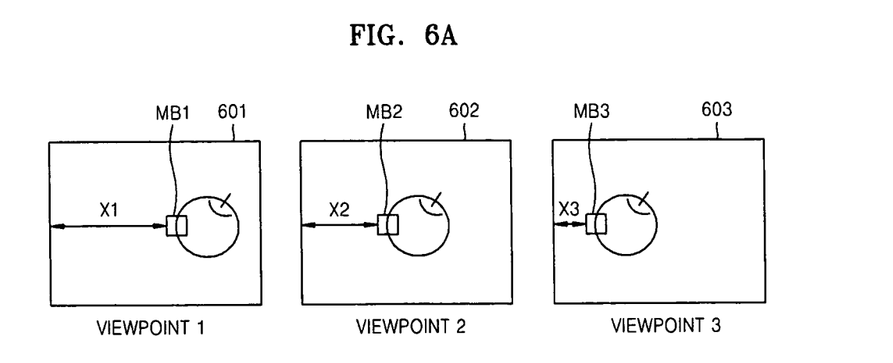
FIG. 6A illustrates three adjacent pictures photographed by three multi-view cameras.
Figure 6B:
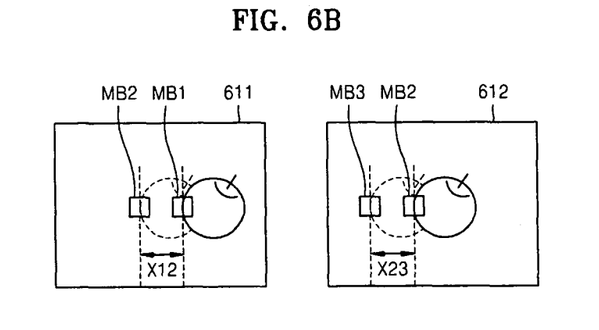
FIG. 6B illustrates two pictures obtained by overlapping the three adjacent pictures illustrated in FIG. 6A.

FIG. 6A illustrates three adjacent pictures photographed by three multi-view cameras, and FIG. 6B illustrates two pictures obtained by overlapping the three adjacent pictures illustrated in FIG. 6A.

Referring to FIG. 6A, in the three multi-view cameras, a picture 601 is photographed by a left multi-view camera at a first viewpoint, a picture 602 is photographed by a middle multi-view camera at a second viewpoint, and a picture 603 is photographed by a right multi-view camera at a third viewpoint. X1 denotes a distance between a left side and a certain block MB1 of the picture 601 at the first viewpoint. X2 denotes a distance between a left side and a block MB2 of the picture 602 at the second viewpoint and the block MB2 corresponds to the certain block MB1 of the picture 601. X3 denotes a distance between a left side and a block MB3 of the picture 603 at the third viewpoint and the block MB3 corresponds to the certain block MB1 of the picture 601.

Referring to FIG. 6B, a picture 611 is obtained by overlapping the picture 601 at the first viewpoint and the picture 602 at the second viewpoint, and a picture 612 is obtained by overlapping the picture 602 at the second viewpoint and the picture 603 at the third viewpoint. X12 of the picture 611 denotes a disparity between the block MB1 of the picture 601 at the first viewpoint and the block MB2 the picture 602 at the second viewpoint, and X23 of the picture 612 denotes a disparity between the block MB2 of the picture 602 at the second viewpoint and the block MB3 of the picture 603 at the third viewpoint. That is, X12=X1−X2, and X23=X2−X3. When the three multi-view cameras are arranged in parallel equally spaced apart, the disparities X12 and X23 are identical to each other. Such a case is generalized as illustrated in FIG. 7.

Figure 7:
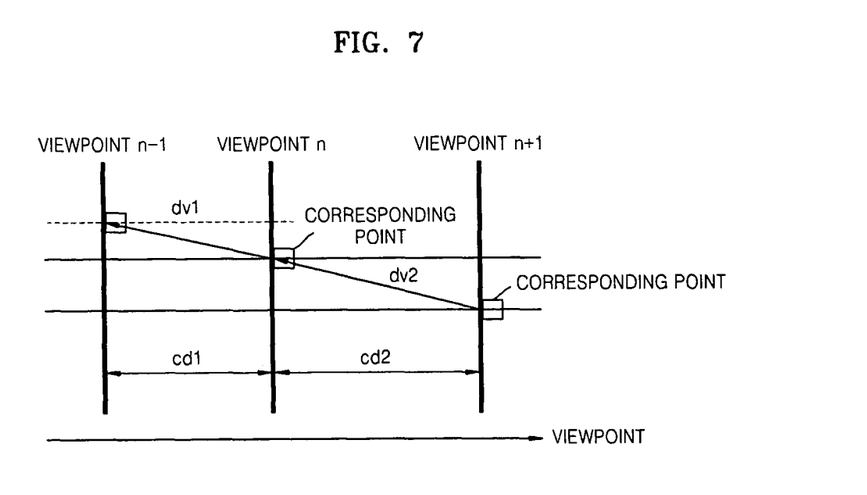
FIG. 7 is a graph illustrating correlations between corresponding points according to distances between multi-view cameras according to an exemplary embodiment of the present invention.

FIG. 7 is a graph illustrating correlations between corresponding points according to distances between multi-view cameras according to an exemplary embodiment of the present invention. Referring to FIG. 7, cd1 denotes a distance of multi-view cameras between two viewpoints n−1 and n, and cd2 denotes a distance of multi-view cameras between two viewpoints n and n+1. dv1 denotes a disparity vector of a certain corresponding block or point between the two viewpoints n−1 and n, and dv2 denotes a disparity vector of a certain corresponding block or point between the two viewpoints n and n+1.

When dv1 and dv2 are in a rectilinear line, Equation 11 is obtained.

$$dv2 = dv1 \times cd2/cd1 \quad (11)$$

Therefore, when dv1, cd1, and cd2 are previously known or estimated, dv2 can be calculated using dv1, cd1, and cd2 instead of the conventional estimation method. Furthermore, FIG. 7 and Equation 11 show that if cd1=cd2 then dv2=dv1. A value of cd2/cd1 corresponds to a translation parameter.

Figure 8:
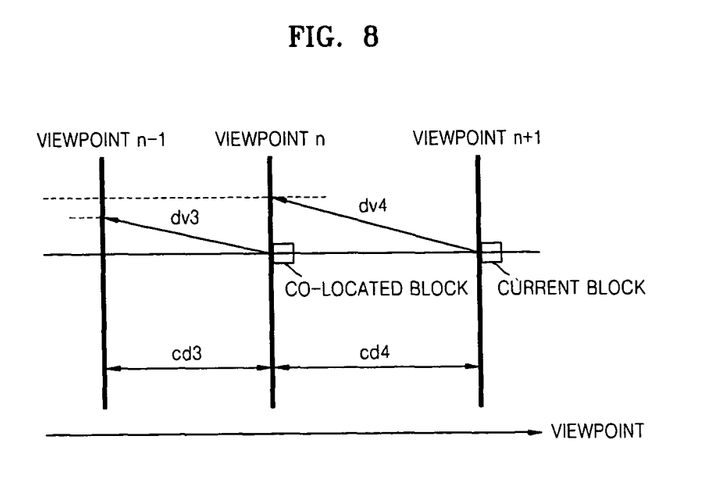
FIG. 8 is a graph illustrating a method of searching for a corresponding point according to an exemplary embodiment of the present invention.

FIG. 8 is a graph illustrating a method of searching for a corresponding point according to an exemplary embodiment of the present invention.

As described with reference to FIG. 7, it is difficult to search for a corresponding block or point whose disparity vector can be calculated using Equation 8. However, blocks adjacent to a current block to be estimated have a similar disparity vector to that of the current block, so that the graph illustrated in FIG. 7 can be modified to that illustrated in FIG. 8.

Referring to FIG. 8, cd3 denotes a distance of multi-view cameras between two viewpoints n−1 and n, cd4 denotes a distance of multi-view cameras between two viewpoints n and n+1, dv3 denotes a disparity vector of a certain corresponding block or point between the two viewpoints n−1 and n, and dv4 denotes a disparity vector of the current block between the viewpoints n and n+1.

In the current exemplary embodiment of the present invention, dv4 can be estimated using the disparity vector dv3 between a co-located block of the current block at the viewpoint n and a corresponding block at the viewpoint n−1 of the co-located block at the viewpoint n. Therefore, the disparity vector of the current block can be calculated by using Equation 12, which is similar to Equation 11.

$$dv4 = dv3 \times cd4/cd3 \quad (12)$$

A value of cd4/cd3 corresponds to a translation parameter. The correlations between disparity vectors of pictures at the viewpoints n−1, n, and n+1 have been described with reference to FIGS. 7 and 8. However, Equations 11 and 12 can be used not only in adjacent pictures but also in pictures spaced apart from each other by a certain gap. In the current exemplary embodiment of the present invention, the disparity vector estimation method is referred to as a spatial direct mode estimation.

Figure 9:
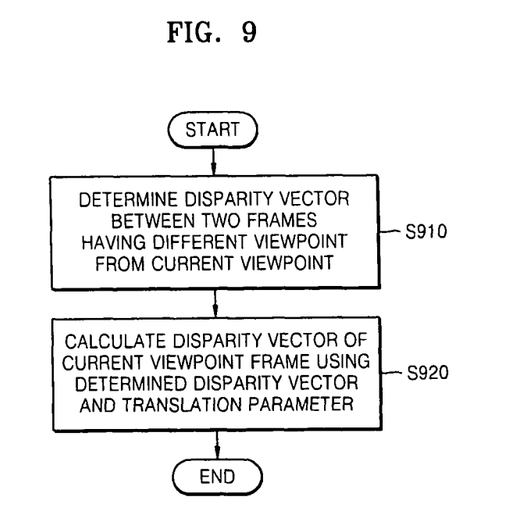
FIG. 9 is a flowchart illustrating a disparity vector estimation method using a spatial direct mode according to an exemplary embodiment of the present invention.

FIG. 9 is a flowchart illustrating a disparity vector estimation method using spatial direct mode estimation according to an exemplary embodiment of the present invention. Referring to FIG. 9, a disparity vector between two frames having different viewpoints from a current viewpoint is determined (Operation 910). A disparity vector of a current viewpoint frame is calculated using the determined disparity vector and a certain translation parameter (Operation 920).

More specifically, for example, when the two frames having different viewpoints from a current viewpoint are first and second viewpoint frames, and the disparity vector of the current viewpoint frame is dv2, dv2 is calculated using Equation 11, i.e., dv2=dv1×cd2/cd1. dv1 denotes the disparity vector between the two frames, i.e., a certain block of the first viewpoint frame and a first block of the second viewpoint frame corresponding to the certain block. dv2 denotes a disparity vector between the first block of the second viewpoint frame and a second block of the current viewpoint frame corresponding to the first block. Also, as described above, cd1 denotes a distance between two cameras photographing the first viewpoint frame and the second viewpoint frame, respectively, cd2 denotes a distance between two cameras photographing the second viewpoint frame and the current viewpoint frame, respectively, and cd2/cd1 is a value corresponding to the translation parameter.

Based on the fact that blocks adjacent to the current block to be estimated have a similar disparity vector to the current block, the disparity vector estimation method of the current exemplary embodiment can be used when two frames having different viewpoints from a current viewpoint are first and second viewpoint frames, and the disparity vector of a current viewpoint frame is dv4 which can be calculated using Equation 12, i.e., dv4=dv3×cd4/cd3.

dv3 denotes the disparity vector between the two frames, i.e., a certain block of the first viewpoint frame and a first block of the second viewpoint frame corresponding to the certain block. dv4 denotes a disparity vector of the second viewpoint frame of a co-located second block of the current viewpoint frame of the first block. A second block is the co-located block of the first block in the current viewpoint frame and is the current block as depicted in FIG. 8. Thus, dv4 denotes a disparity vector of the co-located second block of the first block between the second viewpoint frame and the current viewpoint frame. Also, as described above, cd3 denotes a distance between two cameras photographing the first viewpoint frame and the second viewpoint frame, respectively, cd4 denotes a distance between two cameras photographing the second viewpoint frame and the current viewpoint frame, respectively, and cd4/cd3 is a value corresponding to the translation parameter.

In the current exemplary embodiment, the first viewpoint frame, second viewpoint frame, and the current viewpoint frame are images photographed by a first camera, a second camera, and a third camera, respectively, which are sequentially arranged in parallel. The translation parameter is a value relating to the distances between the multi-view cameras such as cd2/cd1 or cd4/cd3 and can be transmitted from a multi-view camera system.

A multi-view picture encoding apparatus and a multi-view picture decoding apparatus separately perfrom the spatial direct mode estimation of the current exemplary embodiment. When the multi-view picture encoding apparatus uses the spatial direct mode estimation, all disparity vectors need not to be encoded in the multi-view picture encoding apparatus. Also, the multi-view picture decoding apparatus can determine a disparity vector using the disparity vector estimation method according to the spatial direct mode estimation, so that multi-view picture encoding and decoding can be effectively performed.

Figure 10:
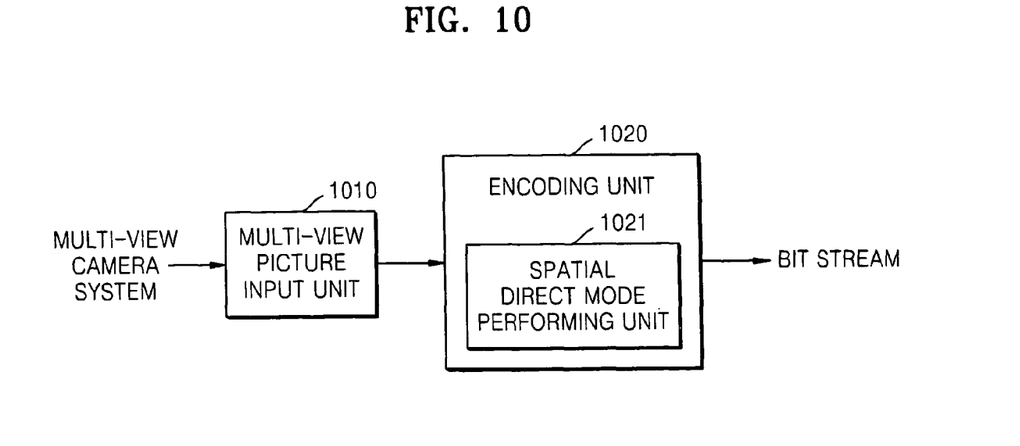
FIG. 10 is a block diagram of a multi-view picture encoding apparatus that performs spatial direct mode estimation according to an exemplary embodiment of the present invention.

FIG. 10 is a block diagram of a multi-view picture encoding apparatus that performs the spatial direct mode estimation according to an exemplary embodiment of the present invention.

Referring to FIG. 10, the multi-view picture encoding apparatus that receives at least three multi-view pictures and encodes the multi-view pictures comprises a multi-view picture input unit 1010 and an encoding unit 1020.

The multi-view picture input unit 1010 receives the three multi-view pictures and a certain camera parameter from a multi-view camera system including a plurality of cameras. The encoding unit 1020 generates an encoded multi-view picture bit stream including the multi-view pictures and the certain camera parameter.

The encoding unit 1020 comprises a spatial direct mode performing unit 1021 for performing the spatial direct mode estimation when estimating a disparity vector. When the certain camera parameter is a translation parameter, the spatial direct mode performing unit 1021 estimates the disparity vector using the spatial direct mode estimation that calculates a disparity vector of a current viewpoint frame using a disparity vector of two frames having a different viewpoint from a current viewpoint and the translation parameter.

The operation of the spatial direct mode performing unit 1021 is described with reference to FIG. 9. The spatial direct mode performing unit 1021 can calculate the disparity vector using Equation 11 or 12.

The encoding unit 1020 sets information indicating the disparity vector estimation method used to encode the three multi-view pictures and transmits the multi-view picture bit stream. When the encoding unit 1020 encodes the multi-view pictures using the same value as the transmitted translation parameter, the encoding unit 1020 further sets information indicating that a translation matrix does not change and transmits the multi-view picture bit stream. Therefore, the multi-view picture encoding apparatus of the present invention does not need to transmit the previously transmitted translation parameter again, which increases multi-view picture encoding efficiency. The information indicating the disparity vector estimation method or the information indicating that the translation matrix does not change can be set as flag information included in the multi-view picture bit stream.

The multi-view picture encoding apparatus of the present invention can perform a conventional multi-view picture encoding method and the multi-view picture encoding method performing the spatial direct mode estimation, selects one of them having high multi-view picture encoding efficiency, and encodes the multi-view pictures.

Figure 11:
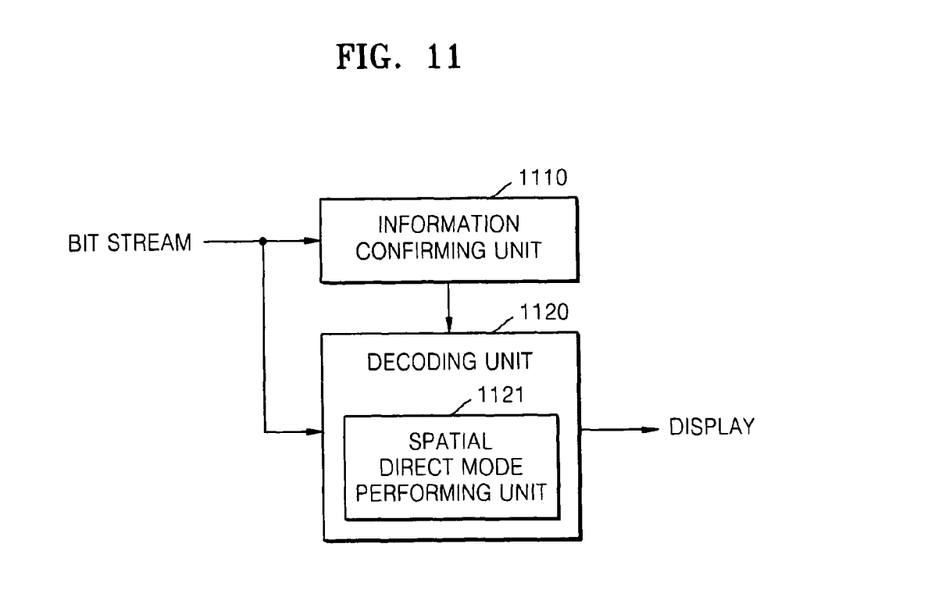
FIG. 11 is a block diagram of a multi-view picture decoding apparatus that performs the spatial direct mode estimation according to an exemplary embodiment of the present invention.

FIG. 11 is a block diagram of a multi-view picture decoding apparatus that performs the spatial direct mode estimation according to an exemplary embodiment of the present invention.

Referring to FIG. 11, the multi-view picture decoding apparatus comprises an information confirming unit 1110 and a decoding unit 1120. The information confirming unit 1110 receives an encoded multi-view picture bit stream and confirms information indicating a disparity vector estimation method included in the received multi-view picture bit stream. The decoding unit 1120 decodes the encoded multi-view picture based on the confirmed information.

The decoding unit 1120 comprises a spatial direct mode performing unit 1121 to perform the spatial direct mode estimation and determine a disparity vector. When the confirmed information about the disparity vector estimation method is the spatial direct mode estimation, the spatial direct mode performing unit 1121 calculates a disparity vector of a current viewpoint frame using a disparity vector between two frames having a different viewpoint from a current viewpoint and a certain translation parameter and thereby determines a disparity.

The operation of the spatial direct mode performing unit 1121 is described with reference to FIG. 9. The spatial direct mode performing unit 1121 can calculate the disparity vector using Equation 11 or 12.

The translation parameter is a value relating to a distance between multi-view cameras and is transmitted from the multi-view picture encoding apparatus. When the multi-view picture encoding apparatus does not transmit the translation parameter but instead transmits information indicating that a previously received translation parameter does not change, the decoding unit 1120 can decode the multi-view picture using the previously received translation parameter.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

According to the present invention, a disparity vector estimation method can enhance the compressibility of a multi-view picture and quickly perform encoding of the multi-view picture using camera parameters, in particular, translation parameters.

The present invention provides multi-view picture encoding and decoding apparatuses using the disparity vector estimation method that uses camera parameters.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of estimating a disparity vector of a multi-view picture, the method comprising:
    determining a disparity vector between two frames having a different viewpoint from a current viewpoint; and
    calculating a disparity vector of a current viewpoint frame using the disparity vector between the two frames and a translation parameter,
    wherein at least one of the determining and the calculating is performed by a processor of a computer system,
    the two frames having the different viewpoint from the current viewpoint are first and second viewpoint frames, and
    the disparity vector of the current viewpoint frame is dv2 which is calculated using $dv2 = dv1 \times cd2/cd1$, where dv1 denotes the disparity vector between the two frames which is calculated using a certain block of the first viewpoint frame and a first block of the second viewpoint frame corresponding to the certain block, dv2 denotes a disparity vector between the first block of the second viewpoint frame and a second block of the current viewpoint frame corresponding to the first block, and cd2/cd1 is a value corresponding to the translation parameter, or
    the disparity vector of the current viewpoint frame is dv4 which is calculated using $dv4 = dv3 \times cd4/cd3$, where dv3 denotes the disparity vector between the two frames which is calculated using a certain block of the first viewpoint frame and a first block of the second viewpoint frame corresponding to the certain block, dv4 denotes a disparity vector of the second viewpoint frame of a co-located second block of the current viewpoint frame of the first block, and cd4/cd3 is a value corresponding to the translation parameter.

2. The method of claim 1, wherein the first viewpoint frame, second viewpoint frame, and the current viewpoint frame are images photographed by a first camera, a second camera, and a third camera, respectively, which are sequentially arranged in parallel.

3. The method of claim 1, wherein the translation parameter is a value relating to distances between a plurality of cameras and is transmitted from a multi-view camera system comprising the plurality of cameras.

4. A multi-view picture encoding apparatus comprising:
    a multi-view picture input unit which receives multi-view pictures and a translation parameter; and
    an encoding unit which generates an encoded multi-view picture bit stream including the multi-view pictures and the translation parameter,
    wherein the encoding unit comprises a spatial direct mode performing unit which estimates a disparity using spatial direct mode estimation that calculates a disparity vector of a current viewpoint frame using a disparity vector between two frames having a different viewpoint from a current viewpoint and the translation parameter,
    the two frames having the different viewpoint from the current viewpoint are first and second viewpoint frames, and
    the disparity vector of the current viewpoint frame is dv2 which is calculated by the spatial direct mode performing unit using $dv2 = dv1 \times cd2/cd1$, where dv1 denotes the disparity vector between the two frames which is calculated using a certain block of the first viewpoint frame and a first block of the second viewpoint frame corresponding to the certain block, dv2 denotes a disparity vector between the first block of the second viewpoint frame and a second block of the current viewpoint frame corresponding to the first block, and cd2/cd1 is a value corresponding to the translation parameter, or
    the disparity vector of the current viewpoint frame is dv4 which is calculated by the spatial direct mode performing unit using $dv4 = dv3 \times cd4/cd3$, where dv3 denotes the disparity vector between the two frames, which is calculated using a certain block of the first viewpoint frame and a first block of the second viewpoint frame corresponding to the certain block, dv4 denotes a disparity vector of the second viewpoint frame of a co-located second block of the current viewpoint frame of the first block, and cd4/cd3 is a value corresponding to the translation parameter.

5. The apparatus of claim 4, wherein the first viewpoint frame, second viewpoint frame, and the current viewpoint frame are images photographed by a first camera, a second camera, and a third camera, respectively, which are sequentially arranged in parallel.

6. The apparatus of claim 4, wherein the translation parameter is a value relating to distances between a plurality of cameras and is transmitted from a multi-view camera system comprising the plurality of cameras.

7. The apparatus of claim 4, wherein the encoding unit sets information including a disparity vector estimation method used to encode the multi-view pictures and transmits the multi-view picture bit stream.

8. The apparatus of claim 7, wherein when the encoding unit encodes the multi-view pictures using a same value as the transmitted translation parameter, the encoding unit further sets information indicating that a translation matrix does not change and transmits the multi-view picture bit stream.

9. A multi-view picture decoding apparatus comprising:
    an information confirming unit which receives an encoded multi-view picture bit stream and confirms information indicating a disparity vector estimation method included in the received multi-view picture bit stream; and
    a decoding unit which decodes the encoded multi-view picture based on the confirmed information,
    wherein the decoding unit comprises a spatial direct mode performing unit, if the confirmed information is spatial direct mode estimation, which calculates a disparity vector of a current viewpoint frame using a disparity vector between two frames having a different viewpoint from a current viewpoint and a translation parameter, and estimates a disparity,
    the two frames having the different viewpoint from the current viewpoint are first and second viewpoint frames, and
    the disparity vector of the current viewpoint frame is $dv2$ which is calculated by the spatial direct mode performing unit using $dv2=dv1 \times cd2/cd1$, where $dv1$ denotes the disparity vector between the two frames which is calculated using a certain block of the first viewpoint frame and a first block of the second viewpoint frame corresponding to the certain block, $dv2$ denotes a disparity vector between the first block of the second viewpoint frame and a second block of the current viewpoint frame corresponding to the first block, and $cd2/cd1$ is a value corresponding to the translation parameter, or
    the disparity vector of the current viewpoint frame is $dv4$ which is calculated by the spatial direct mode performing unit using $dv4=dv3 \times cd4/cd3$, where $dv3$ denotes the disparity vector between the two frames, which is calculated using a certain block of the first viewpoint frame and a first block of the second viewpoint frame corresponding to the certain block, $dv4$ denotes a disparity vector of the second viewpoint frame of a co-located second block of the current viewpoint frame of the first block, and $cd4/cd3$ is a value corresponding to the translation parameter.

10. The apparatus of claim 9, wherein the translation parameter is a value relating to distances between the multi-view cameras and is transmitted from a multi-view picture encoding apparatus.

11. The apparatus of claim 9, wherein information indicating that a previously received translation parameter does not change is received from a multi-view picture encoding apparatus, and
    the decoding unit decodes the multi-view picture using the previously received translation parameter.

12. A non-transitory computer-readable recording medium having recorded thereon a program which when executed by a computer, causes the computer to execute a method of estimating a disparity vector of a multi-view picture, the method comprising:
    determining a disparity vector between two frames having a different viewpoint from a current viewpoint; and
    calculating a disparity vector of a current viewpoint frame using the disparity vector between the two frames and a translation parameter,
    wherein the two frames having the different viewpoint from the current viewpoint are a first viewpoint frame and a second viewpoint, and
    the disparity vector of the current viewpoint frame is $dv2$ which is calculated by the spatial direct mode performing unit using $dv2=dv1 \times cd2/cd1$, where $dv1$ denotes the disparity vector between the two frames which is calculated using a certain block of the first viewpoint frame and a first block of the second viewpoint frame corresponding to the certain block, $dv2$ denotes a disparity vector between the first block of the second viewpoint frame and a second block of the current viewpoint frame corresponding to the first block, and $cd2/cd1$ is a value corresponding to the translation parameter, or
    the disparity vector of the current viewpoint frame is $dv4$ which is calculated by the spatial direct mode performing unit using $dv4=dv3 \times cd4/cd3$, where $dv3$ denotes the disparity vector between the two frames, which is calculated using a certain block of the first viewpoint frame and a first block of the second viewpoint frame corresponding to the certain block, $dv4$ denotes a disparity vector of the second viewpoint frame of a co-located second block of the current viewpoint frame of the first block, and $cd4/cd3$ is a value corresponding to the translation parameter.

\* \* \* \* \*